United States Patent
Laumen et al.

(10) Patent No.: US 7,212,807 B2
(45) Date of Patent: May 1, 2007

(54) METHOD, APPARATUS AND SOFTWARE PROGRAM FOR PROCESSING AND/OR EVALUATING MMS-RELATED MESSAGES

(75) Inventors: Josef Laumen, Hildesheim (DE); Sabine Van Niekerk, Salzgitter (DE); Andreas Schmidt, Braunschweig (DE)

(73) Assignee: Siemens Aktiengesellschaft, Munich (DE)

( * ) Notice: Subject to any disclaimer, the term of this patent is extended or adjusted under 35 U.S.C. 154(b) by 698 days.

(21) Appl. No.: 10/186,365

(22) Filed: Jun. 27, 2002

(65) Prior Publication Data

US 2003/0040299 A1   Feb. 27, 2003

(30) Foreign Application Priority Data

Jun. 27, 2001  (EP) .................................. 01115522

(51) Int. Cl.
*H04L 12/58* (2006.01)
*H04L 29/06* (2006.01)
*H04M 3/42* (2006.01)

(52) U.S. Cl. ............................... 455/412.1; 455/414.1; 455/414.3; 709/206; 709/207; 709/213; 709/217; 709/218; 709/219

(58) Field of Classification Search ............. 455/412.1, 455/414.1, 414.3; 709/206, 207, 213, 217, 709/218, 219
See application file for complete search history.

(56) References Cited

U.S. PATENT DOCUMENTS

| | | | | |
|---|---|---|---|---|
| 5,951,638 A | * | 9/1999 | Hoss et al. | ................. 709/206 |
| 2002/0087656 A1 | * | 7/2002 | Gargiulo et al. | ............ 709/217 |

* cited by examiner

*Primary Examiner*—Duc M. Nguyen
*Assistant Examiner*—Matthew Genack
(74) *Attorney, Agent, or Firm*—Bell, Boyd & Lloyd LLP

(57) ABSTRACT

A method for processing and/or evaluating MMS (Multimedia Messaging Service)-related messages (Multimedia Messages (MMs), parts of MMs, delivery reports, read-reply reports, MMS notifications, etc.), on a device or device ensemble adapted to participate in mobile telecommunication (Mobile Station (MS); User Equipment (UE); Mobile Equipment (ME); laptop, notebook, organizer, PC, etc., connected to a MS, UE, etc.), the device or device ensemble accommodating an MMS User Agent and accommodating or adapted to accommodate at least one SIM card (Subscriber Identity module) and/or one UICC (Universal Integrated Circuit Card) with a USIM (UMTS (Universal Mobile Telecommunication Service)-SIM), wherein the MMS-related messages are terminal originated or terminal terminated. The MMS-related messages are processed and/or evaluated by at least one SAT/USAT application (SIM Application Toolkit/USIM Application Toolkit) residing on the SIM card/UICC.

19 Claims, 2 Drawing Sheets

METHOD, APPARATUS AND SOFTWARE PROGRAM FOR PROCESSING AND/OR EVALUATING MMS-RELATED MESSAGES

BACKGROUND OF THE INVENTION

Today, in mobile networks like GSM (Global System for Mobile Communication), SMS (Short message Service) is used to send and receive short messages between mobile terminals. Currently a new messaging service, the so-called MMS (Multimedia Messaging Service) is being standardized, see 3 GPP TS 23.140 V4.2.0 (Release 4), Multimedia Messaging Service (MMS), Functional description, stage 2. Contrary to SMS, MMS messages can contain multimedia elements, such as, for example, text, image, audio or video.

MMS is a peer-to-peer messaging service between two MMS User Agents which are both connected to an MMS Relay/Server. The User Agent resides either on a mobile phone, such as a UMTS-UE (Universal Mobile, Telecommunication Service User Equipment) or a GSM-MS (Mobile Station), or on an external device, such as a notebook/laptop, connected to a mobile phone, or even on a PC. The User Agent is an application layer function that provides the user with the ability to view, compose and handle the Multimedia Messages (MMs; the ending "s" is used throughout for plurals); e.g., submitting, receiving, delivery of MMs. The MMS Relay/Server is a network entity responsible for storage and handling of incoming and outgoing messages and for the transfer of the message between different messaging systems.

Mobile communication services such as the 2nd generation, (e.g., GSM), and the 3rd generation, (e.g., UMTS), use well-defined smart cards in addition to mobile phones. Plugged into a mobile phone, these smart cards enable a user to use the mobile communication service he/she has subscribed to. Moreover, user preferences and settings as well as user's personal information can be stored on such smart cards.

In GSM, these cards are called SIM (subscriber identity module). In UMTS, one distinguishes between the physical card which is called UICC (universal IC card; IC: Integrated Circuit), and its logical functionality, the USIM (UMTS subscriber identity module).

It is an aim of the present invention to find new and simple ways of handling and processing and/or evaluating MMS-related messages, particularly with respect to the needs of operators owning the above mentioned smart cards.

SUMMARY OF THE INVENTION

The present invention proposes new SAT or USAT mechanisms which enable an operator to write operator-specific mobile phone applications which control and/or make use of MMS functionality residing on a mobile phone. The methods described herein allow the Mobile Equipment (ME) of the Mobile Station or the User Equipment to support SAT or USAT mechanisms for MMS. (A Mobile Equipment plus an inserted SIM card and/or an UICC is called Mobile Station (MS) in GSM and User Equipment (UE) in UMTS). The present invention also covers the storage media, such as an SIM or UICC card, on which the SAT/USAT application(s) according to the present invention reside.

The present invention is particularly directed, on the side of the telecommunication device or device ensemble, towards a method of controlling MMS functionality residing on the device or device ensemble and for using MMS functionality as a bearer service in the download and/or upload direction. The present invention is also concerned with the respective methods on the side of network elements, as well as the respective devices and software programs.

SAT/USAT (SIM Application Toolkit/USIM application Toolkit) is a toolkit which provides operators with API (Application Programming Interface) to put their own, operator-specific applications on an SIM or a UICC card taking into account the particularities of mobile phones, independent of the particular operator, smart card manufacturer and mobile phone manufacturer. For that purpose, SAT/USAT provides a standardized execution environment for applications stored on the SIM/USIM card and the ability to utilize certain functions of the supporting Mobile Equipment (ME); i.e., the mobile phone. SAT/USAT provides mechanisms which allow applications, existing in the SIM/USIM, to interact and operate with any ME which supports the specified mechanism(s), thus ensuring interoperability between a SIM card/USIM and an ME, independent of the respective manufacturers and operators. The SIM card/UICC card is the physical basis for this toolkit since SIM card/UICC are owned by the operator and, thus can most easily be adapted to the operator's needs. For a more detailed explanation of USAT, see 3 GPP TS 31.111 V4.2.1 (Release 4), USIM Application Toolkit.

In a first preferred embodiment of the present invention, the at least one SAT/USAT application on the SIM card/UICC is configured such as to control the MMS functionality. According to the present invention, the SAT or USAT mechanisms (in the following the abbreviation (U)SAT) is often used) are extended for MMS, like allowing operator-specific USAT applications to perform checking, modifying, sending, downloading, displaying, etc., of an MM, parts of an MM, MMS notification, MMS delivery report and MMS read-reply report. Using such (U)SAT mechanism(s) has the advantage that the operators can define their own (U)SAT functionality for MMS (in addition to the features in 3 GPP TS 31.111 V4.2.1) and are so able to still have some control about the used service on the terminal.

Accordingly, this first embodiment of the present invention suggests that via the above-described methods, an operator can put his/her own application on a SIM card/UICC which can use MMS functionality of the terminal via these SAT or USAT mechanisms. By passing the Multimedia Messages, the MMS notifications, the delivery reports and read-reply reports (preferably for both the sending and the receiving case) first to (U)SAT, (U)SAT can check, modify, allow/disallow them (or their headers).

In a second preferred embodiment of the present invention, the Multimedia Messaging Service is used as a bearer; i.e., as a transport mechanism for SAT or USAT applications. In this case, MMS is used as a transport mechanism for over-the-air data exchange of a remote entity, especially as an application server in the operator's network, and a Mobile Equipment. The advantage of this is to allow the operator to exchange any kind of data of any size with a remote entity.

Preferably, a new information element with the exemplary name "MMS bearer" is introduced. By checking this information element, (U)SAT can determine if the MMS is used as a bearer service or as a normal messaging service.

Both described preferred embodiments have the advantage that the usage of the (U)SAT mechanisms is independent of the particular Mobile Equipment (i.e., mobile phone) the user uses at a certain point of time. The (U)SAT functionality is processed on the SIM card or the USIM card on the UICC, which can be plugged into a Mobile Equipment or an apparatus connected with a terminal.

Moreover, the above (U)SAT mechanisms are independent of the particular operator or SIM card/UICC manufacturer. As such, third-party application developers can create applications based on these (U)SAT mechanisms which are platform-independent and can sell these applications to any operator and/or any SIM card/UICC manufacturer.

Additional features and advantages of the present invention are described in, and will be apparent from, the following Detailed Description of the Invention and the Figures.

DETAILED DESCRIPTION OF THE INVENTION

In the following, two examples for the usage of MMS and (U)SAT are discussed. The first example concerns a (U)SAT controlling a terminal's MMS functionality, while the second example concerns MMS as a bearer service for (U)SAT. In both cases, it is assumed that the UICC-(or SIM card) consists of a (U)SAT application and that this (U)SAT application is activated. In addition, it is assumed that the terminal, into which the SIM card/UICC is plugged, owns an MMS User Agent; i.e., that MMS functionality is residing on the terminal.

1. (U)SAT controlling a terminal's MMS functionality:

The MMS User Agent (UA) is an application-layer functionality on a device which provides the users with the ability to view, compose and handle MMs; e.g., submitting, receiving, deleting of MMs. Beside this, the MMS User Agent is able to receive MMS notifications and to present these notifications to the user in order to inform the user about MMs which are available for reception from the network. Via the MMS User Agent, an MMS subscriber may also request, allow/disallow and display delivery reports and read-reply reports.

The present invention proposes (U)SAT mechanisms to control and take care of handling the above described features of the MMS User Agent. When a Multimedia Message, headers of an MM, any other parts of an MM or read-reply reports are first passed to (U)SAT before sending the Multimedia Message, an (U)SAT application can check and modify the Multimedia Message and/or the Multimedia Message header and/or any other parts of the MM and can take care of allowing/disallowing the sending of Multimedia Messages, delivery reports and readreply reports from the MMS User Agent.

When a Multimedia Message, headers of an MM, any other parts of an MM, notifications, delivery reports or read-reply reports are passed to (U)SAT immediately after they are 7 received by the terminal (i.e., before these are rendered to the user or further processed and/or evaluated by the MMS User Agent) (U)SAT can check and modify these and can take care of receiving, downloading and displaying them.

In this example, two different cases are described in more detail. The first case concerns the control of sending an MM by USAT. The second case concerns the control of receiving an MM by USAT.

Figure 1:
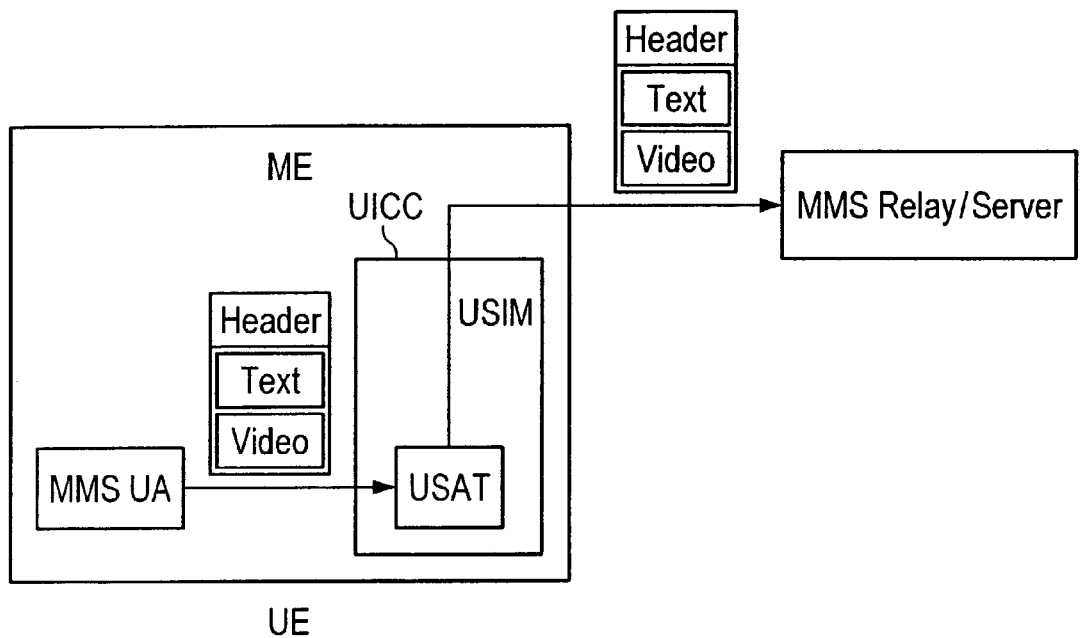
FIG. 1 shows the control of sending a Multimedia Message by (U) SAT.

1.a) Controlling of Sending an MM by USAT:

A user has composed a Multimedia Message (MM) on his/her device; e.g., mobile phone. Before the ME (Mobile Equipment) sends the Multimedia Message (or parts of it) to the MMS Relay/Server, the ME passes the Multimedia Message first to USAT as shown in FIG. 1. The Multimedia Message header and the Multimedia Message content can be checked and, if necessary, modified (or sending can even be disallowed) by the operator-specific USAT application. After this, the Multimedia Message is passed back to the ME, which sends the modified or unmodified Multimedia Message to the MMS Relay/Server. This gives operators a way to control the sending of Multimedia Messages by putting an appropriate operator-specific USAT application on the UICC.

Figure 2:
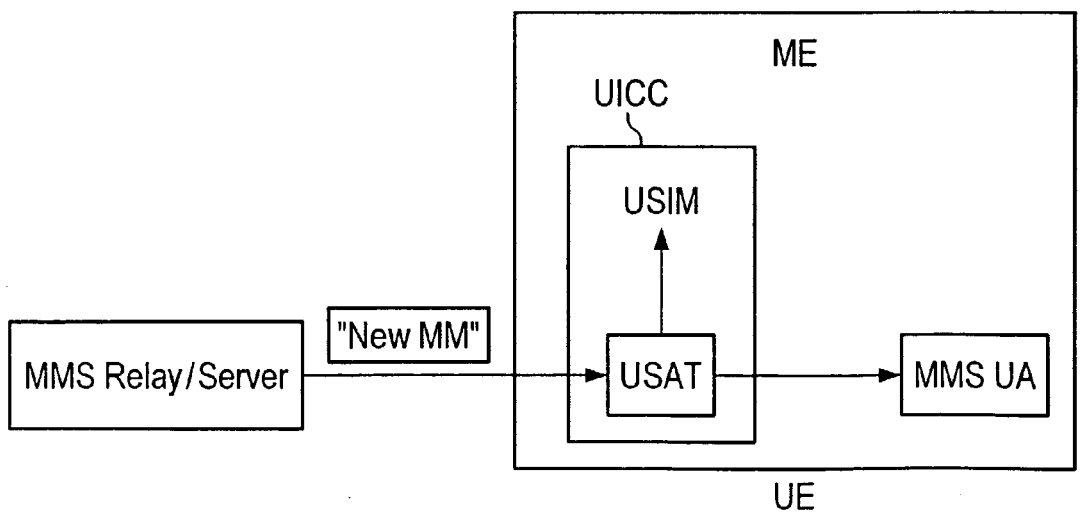
FIG. 2 shows the control of receiving a Multimedia Message by (U) SAT.

1.b) Controlling of Receiving of an MM by USAT:

When the ME has received an MMS notification from the MMS Relay/Server, this notification is passed first to USAT. Depending on the operator's definitions for MMS, the operator-specific USAT application can check, modify or even delete the MMS notification. After this, the operator-specific USAT application may control which action is to be taken based on the MMS notification; e.g., it may trigger the MMS User Agent to immediately retrieve the notified MM from the Relay/Server. The notification also can be passed to the terminal for displaying it to the user or can be passed to the UICC for storage of the notification on the USIM. The latter two cases are schematically shown in FIG. 2. The above described mechanisms give operators a way to control the receiving of Multimedia Messages by putting an appropriate operator-specific USAT application on the UICC.

Figure 3:
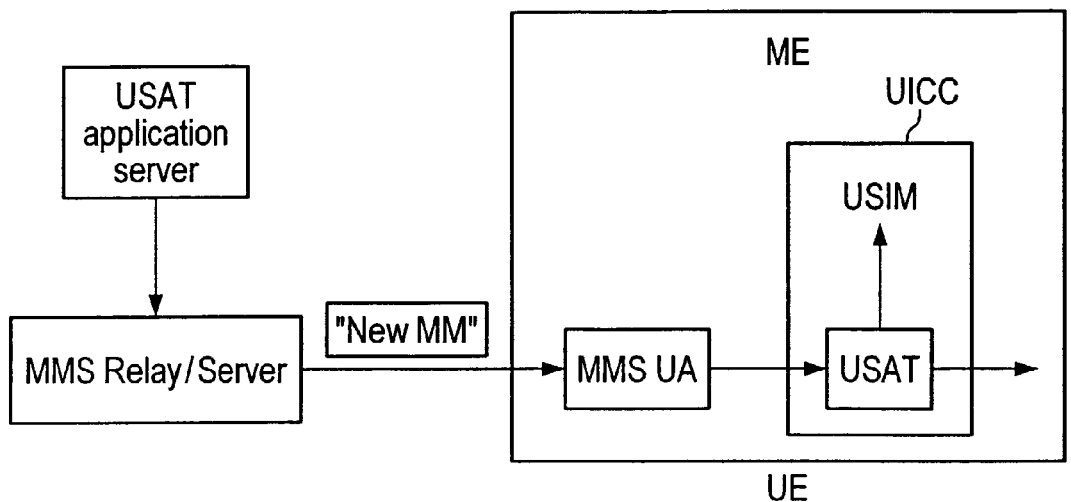
FIG. 3 shows MMS as a bearer service for USAT in case of terminal terminated MM.

2. MMS as a Bearer Service for USAT:

As shown in FIG. 3 for the case of terminal terminated MM,

MMS can be used as a transport mechanism for data exchange between a remote entity, such as a USAT application server in the operator network, and an operator-specific USAT application on the UICC via the MMS User Agent which resides, on the terminal.

Using MMS as a bearer service for USAT (SAT) allows the operator to create his/her own USAT (SAT) applications residing on the UICC (SIM) which use the MMS User Agent on the terminal in order to exchange data over the air with remote entities. The user will not notice that MMS is used for these operator-specific applications; it all happens in the background.

However, the MMS User Agent on the device as well as the MMS Relay/Server in the network have to know that an MMS notification, a Multimedia Message (or parts of it), a delivery report and/or a read-reply report or other messages have to be passed on to a USAT (SAT) application. This can be done by putting an information element called, for example, "MMS bearer" in the header of the MMS notification, the Multimedia Message, the delivery report or the read-reply report. This information element can be, for example, a flag, which can be set ("1") or not set ("0").

Figure 4:
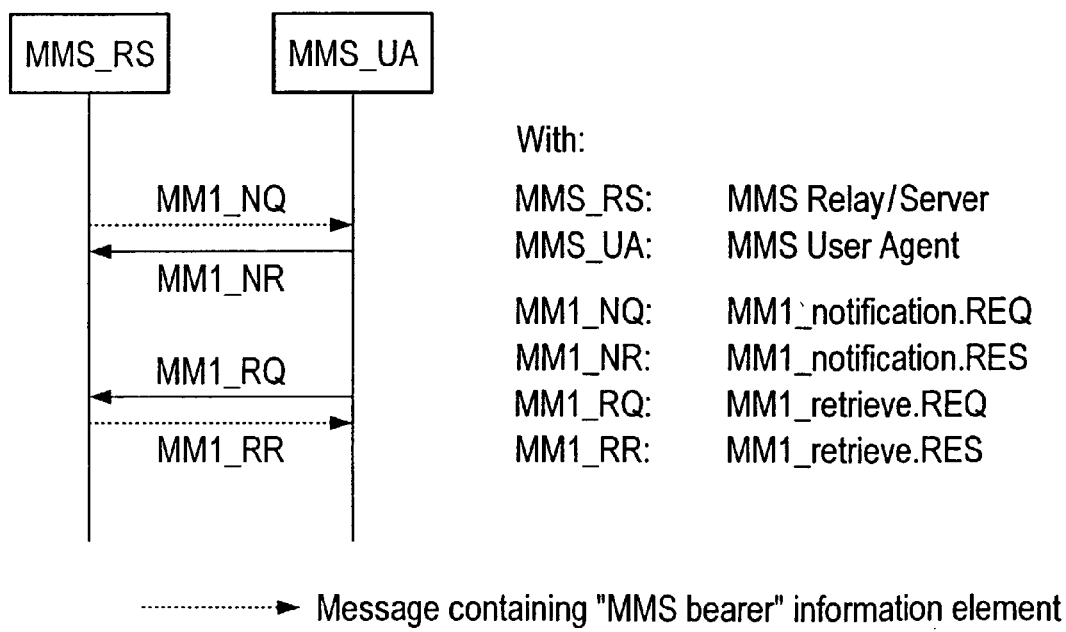
FIG. 4 shows the transaction flow for using MMS as bearer service for USAT in case of terminal terminated MM.

2.a) Terminal terminated MM:

The information element can be used, for example, to download data from a USAT application server in the network to the USAT application in the UICC, as shown in FIG. 3. The operator's USAT application server in the network sends an MM with the aforementioned data as the MM's content to the MMS Relay/Server. As shown in the transaction flow diagram of FIG. 4, the MMS Relay/Server (MMS RS) sends a notification MM1 NQ (MM1 notification.REQ) to the MMS User Agent (MMS UA) to inform the MMS User Agent that a new Multimedia Message has arrived. The Mobile Station passes the notification first to USAT, before doing anything with it. USAT checks if the information element "MMS bearer" is set or not. In this example this flag has been set because MMS is used as a bearer service for USAT. The MMS User Agent responds with an MM1 NR (M1 notification.RES). After receiving the notification, the MMS User Agent can retrieve the MM, either immediately or at a later time, and either manually or automatically, as possibly determined by the operator configuration and user profile.

In one preferred embodiment of the present invention, the message is retrieved immediately. The MMS User Agent will send a request MM1 RR for immediate retrieval of the Multimedia Message (MM1-retrieve.REQ) to the MMS Relay/Server. Finally, the MMS Relay/Server sends the Multimedia Message MM1 RR (MM1_retrieve.RES) down to the MMS User Agent which will immediately pass it on to USAT and the-operator's USAT application. Here, the MM is handled further; e.g., the aforementioned data are interpreted.

The MMS User Agent has to know that the MMS notification MM1 NQ (112 notification.REQ) and the Multimedia Message MM1 RR (MM1_retrieve.RES) both are used by USAT as bearer service and, thus, have to be passed on to USAT. Because of this, the "MMS bearer" information element has to be conveyed in the message MM1 NQ (MM1 notification.RES) and in the message MM1 RR (MM1_retrieve.RES); see FIG. 4.

2.b) Terminal Originated MM:

In a similar manner, the information element "MMS bearer" can be used, for example, to upload data from a USAT application in the UICC, which is plugged into a mobile phone to a USAT application server in the network. The operator's USAT application in the UICC passes an MM with the aforementioned data as the MM's content to the MMS User Agent residing on the mobile phone or passes the aforementioned data to the MMS User Agent together with a command which makes the MMS User Agent compose an MM with this data as the Mm's content (in this latter case, the MMS-related message according to present invention is the command plus the data). Based on this, the MM is submitted from the MMS User Agent to the MMS Relay/Server, carrying the information element "MMS bearer". Upon MM submission, the USAT application in the UICC may also request a status information about the delivery and/or handling of the MM; i.e., it may request an MMS delivery report and/or an MMS read-reply report. Such a report would then be retrieved from either the MMS Relay/Server or the recipient of the MM which is the USAT application server in the network. These reports would also carry the information element "MMS bearer" in order to enable their routing back to the USAT application on the UICC.

Besides the methods described, the present invention also relates to the respective devices or device ensembles, such as Mobile Stations (MS), User Equipment (UE), and/or apparatuses connected to such devices (laptops, organizer, PC, etc), which are adapted to perform the inventive method steps. Especially, the User Agent residing on these devices and apparatuses have to be adapted for handling the MMSrelated messages, particularly to evaluate the information element. Other devices covered by the present invention are the storage media to be plugged into an ME, particularly SIM cards and UICCs, which must be adapted to accommodate the respective SAT and/or USAT mechanisms according to the present invention. The present invention also includes the network elements as (U)SAT application servers and MMS Relay/Servers. Also covered by the present invention are the respective software programs for the processing and/or evaluating of the MMS-related messages as well as for the communication between the MMS Relay Server and the MMS User Agent and/or the Mobile Equipment, as well as between the MMS User Agent and the (U) SAT.

Although the present invention has been described with reference to specific embodiments, those of skill in the art will recognize that changes may be made thereto without departing from the spirit and scope of the present invention as set forth in the hereafter appended claims.

The invention claimed is:

1. A method for at least one of processing and evaluating an Multimedia Messaging Service (MMS)-related message on an apparatus for mobile telecommunication, the method comprising the steps of:

enabling the apparatus to accommodate an MMS user agent;

enabling the apparatus to accommodate at least one of one universal IC card (UICC) having a UMTS subscriber identity module (USIM) and at least one subscriber identity module (SIM) card, wherein the MMS-related message is one of terminal originated and terminal terminated; and effecting the at least one of the processing and evaluating of the MMS-related message by at least one application toolkit residing on the at least one of the SIM card and the UICC, with the application toolkit being one of an SIM application toolkit (SAT) application and a USIM application toolkit (USAT) application, wherein the step of effecting further comprises controlling at least part of the MMS functionality on the apparatus by passing the MMS-related message to the SAT or USAT application before sending or receiving the message, wherein the SAT or USAT application performs at least one of the steps of:

checking at least one of outgoing and incoming multimedia messages, MMS notifications, delivery reports and read-reply reports;

modifying the outgoing and incoming multimedia messages, delivery reports and read-reply reports;

deleting the multimedia messages, MMS notifications, delivery reports and read-reply reports;

initiating sending of the multimedia messages, MMS notifications, delivery reports and read-reply reports from the apparatus;

initiating downloading of the multimedia messages, MMS notifications, delivery reports and read-reply reports to the apparatus;

initiating storage of the multimedia messages, MMS notifications, delivery reports and read-reply reports on the respective SIM card and the UICC;

allowing and disallowing the sending of multimedia messages, delivery reports and read-reply report; and initiating display of multimedia messages, MMS notifications, delivery reports and read-reply reports on the apparatus.

2. A method for at least one of processing and evaluating an MMS-related message as claimed in claim 1, wherein the MMS-related message is received by the apparatus from an MMS relay/server and passed on by the MMS user agent to the at least one application toolkit for the respective processing and evaluating of the MMS-related message, with MMS being used as a bearer service for the application toolkit.

3. A method for at least one of processing and evaluating an MMS-related message as claimed in claim 2, wherein the MMS user agent passes on the MMS-related message from the MMS relay/server to the application toolkit after positively checking whether MMS is used as a bearer service.

4. A method for at least one of processing and evaluating an MMS-related message as claimed in claim 2, wherein the MMS user agent sends a request to the MMS relay/server for immediate retrieval of the multimedia message when being informed by the application toolkit that MMS is used as a bearer service.

5. A method for at least one of processing and evaluating an MMS-related message as claimed in claim 2, wherein the application toolkit uses MMS as a bearer service for uploading data via the MMS user agent and the MMS relay/server to a network element.

6. A method for at least one of processing and evaluating an MMS-related message as claimed in claim 5, wherein the application toolkit passes a multimedia message with the data as content of the multimedia message to the MMS user agent and the multimedia message is submitted from the MMS user agent to the MMS relay/server.

7. A method for at least one of processing and evaluating an MMS-related message as claimed in claim 5, wherein the application toolkit passes the data to the MMS user agent together with a command for the MMS user agent to compose a multimedia message with the data as the content of the multimedia message and the multimedia message is submitted from the MMS user agent to the MMS relay/server.

8. A method for at least one of processing and evaluating an MMS-related message as claimed in claim 5, wherein the application toolkit requests status information about at least one of delivery and handling of the multimedia message to be retrieved from one of the MMS relay/server and the network elements.

9. A method for at least one of processing and evaluating an MMS-related message as claimed in claim 5, wherein at least one of the MMS user agent, the application toolkit and the network element identifies the MMS-related messages, for which MMS is used as a bearer service, by an information element in a header of the multimedia message.

10. A method for at least one of processing and evaluating an MMS-related message as claimed in claim 9 wherein a flag is used as the information element in the header.

11. An apparatus for processing a Multimedia Messaging Service (MMS)-related message on an apparatus for mobile telecommunication, the method comprising:
   a MMS user agent;
   a module, comprising at least one of one universal IC card (UICC) having a UMTS subscriber identity module (USIM), and at least one subscriber identity module (SIM) card, and
   at least one application toolkit residing on the at least one of the SIM card and the UICC, with the application toolkit being one of an SIM application toolkit (SAT) application and a USIM application toolkit (USAT) application, wherein the at least one application toolkit controls at least part of the MMS functionality on the apparatus, and wherein the MMS-related message is transmitted to the SAT or USAT application before sending or receiving the message, and wherein the SAT or USAT application functions to execute at least one of the operations of:

checking at least one of outgoing and incoming MMS messages, including MMS notifications, delivery reports and read-reply reports related to the messages;
   modifying the outgoing and incoming MMS messages, delivery reports and read-reply reports related to the messages;
   deleting the MMS messages, MMS notifications, delivery reports and read-reply reports related to the messages;
   initiating sending of the MMS messages, MMS notifications, delivery reports and read-reply reports related to the messages from the apparatus;
   initiating downloading of the MMS messages, MMS notifications, delivery reports and read-reply reports related to the messages to the apparatus;
   initiating storage of the MMS messages, MMS notifications, delivery reports and read-reply reports related to the messages on the respective SIM card and the UICC;
   allowing and disallowing the sending of MMS messages, delivery reports and read-reply reports related to the messages; and
   initiating display of MMS messages, MMS notifications, delivery reports and read-reply reports related to the messages on the apparatus.

12. The apparatus for processing a Multimedia Messaging Service (MMS)-related message on an apparatus for mobile telecommunication as claimed in claim 11, wherein the MMS-related message is received by the apparatus from an MMS relay/server and passed on by the MMS user agent to the at least one application toolkit for the respective processing and evaluating of the MMS-related message, with MMS being used as a bearer service for the application toolkit.

13. The apparatus for processing a Multimedia Messaging Service (MMS)-related message on an apparatus for mobile telecommunication as claimed in claim 12, wherein the MMS user agent passes on the MMS-related message from the MMS relay/server to the application toolkit after positively checking whether MMS is used as a bearer service.

14. The apparatus for processing a Multimedia Messaging Service (MMS)-related message on an apparatus for mobile telecommunication as claimed in claim 12, wherein the MMS user agent sends a request to the MMS relay/server for immediate retrieval of the multimedia message when being informed by the application toolkit that MMS is used as a bearer service.

15. The apparatus for processing a Multimedia Messaging Service (MMS)-related message on an apparatus for mobile telecommunication as claimed in claim 12, wherein the application toolkit uses MMS as a bearer service for uploading data via the MMS user agent and the MMS relay/server to a network element.

16. The apparatus for processing a Multimedia Messaging Service (MMS)-related message on an apparatus for mobile telecommunication as claimed in claim 15, wherein the application toolkit passes a multimedia message with the data as content of the multimedia message to the MMS user agent and the multimedia message is submitted from the MMS user agent to the MMS relay/server.

17. The apparatus for processing a Multimedia Messaging Service (MMS)-related message on an apparatus for mobile telecommunication as claimed in claim 15, wherein the application toolkit passes the data to the MMS user agent together with a command for the MMS user agent to compose a multimedia message with the data as the content of the multimedia message and the multimedia message is submitted from the MMS user agent to the MMS relay/server.

18. The apparatus for processing a Multimedia Messaging Service (MMS)-related message on an apparatus for mobile telecommunication as claimed in claim 15, wherein the application toolkit requests status information about at least one of delivery and handling of the multimedia message to be retrieved from one of the MMS relay/server and the network elements.

19. The apparatus for processing a Multimedia Messaging Service (MMS)-related message on an apparatus for mobile telecommunication as claimed in claim 15, wherein at least one of the MMS user agent, the application toolkit and the network element identifies the MMS-related messages, for which MMS is used as a bearer service, by an information element in a header of the multimedia message.

* * * * *